__

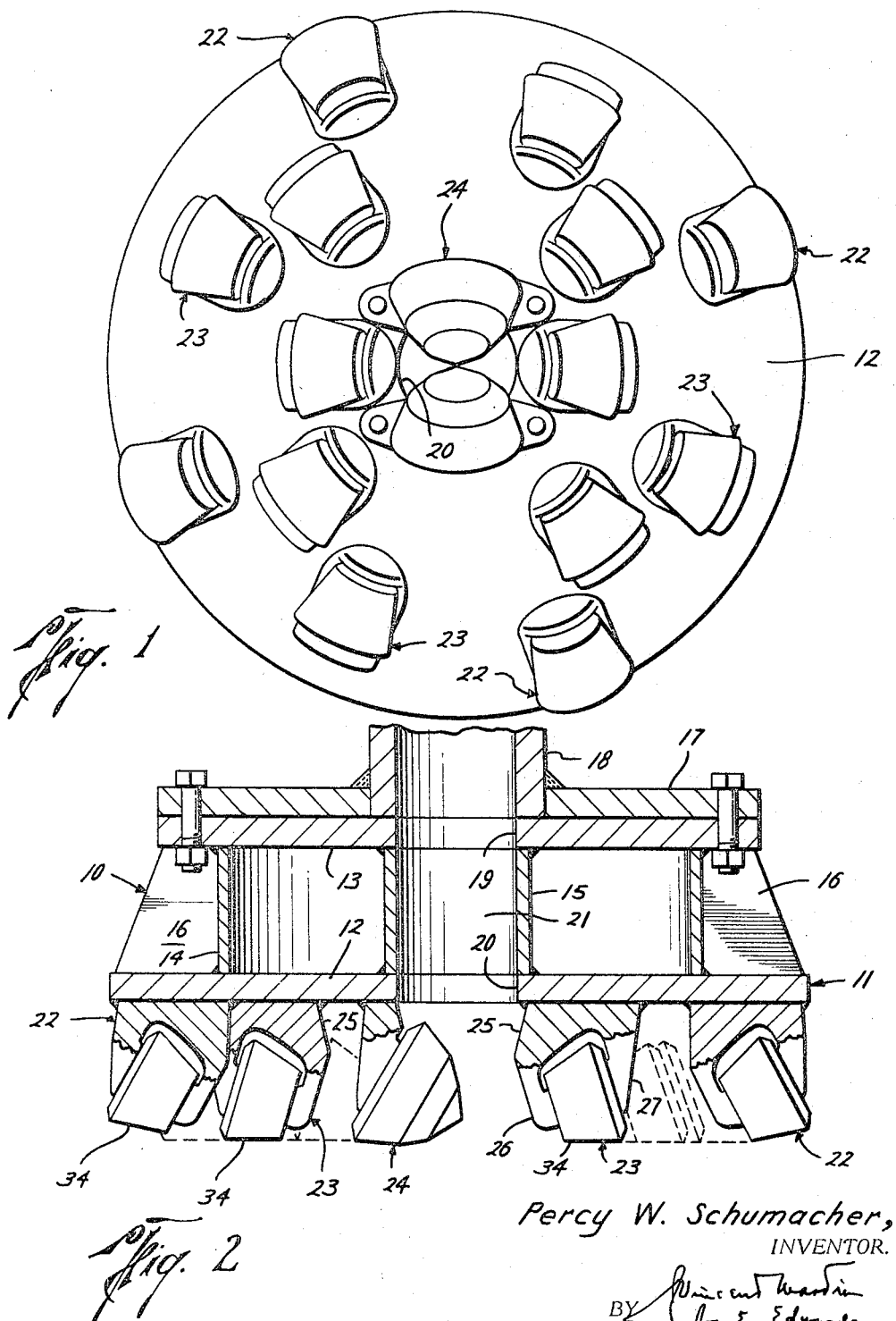

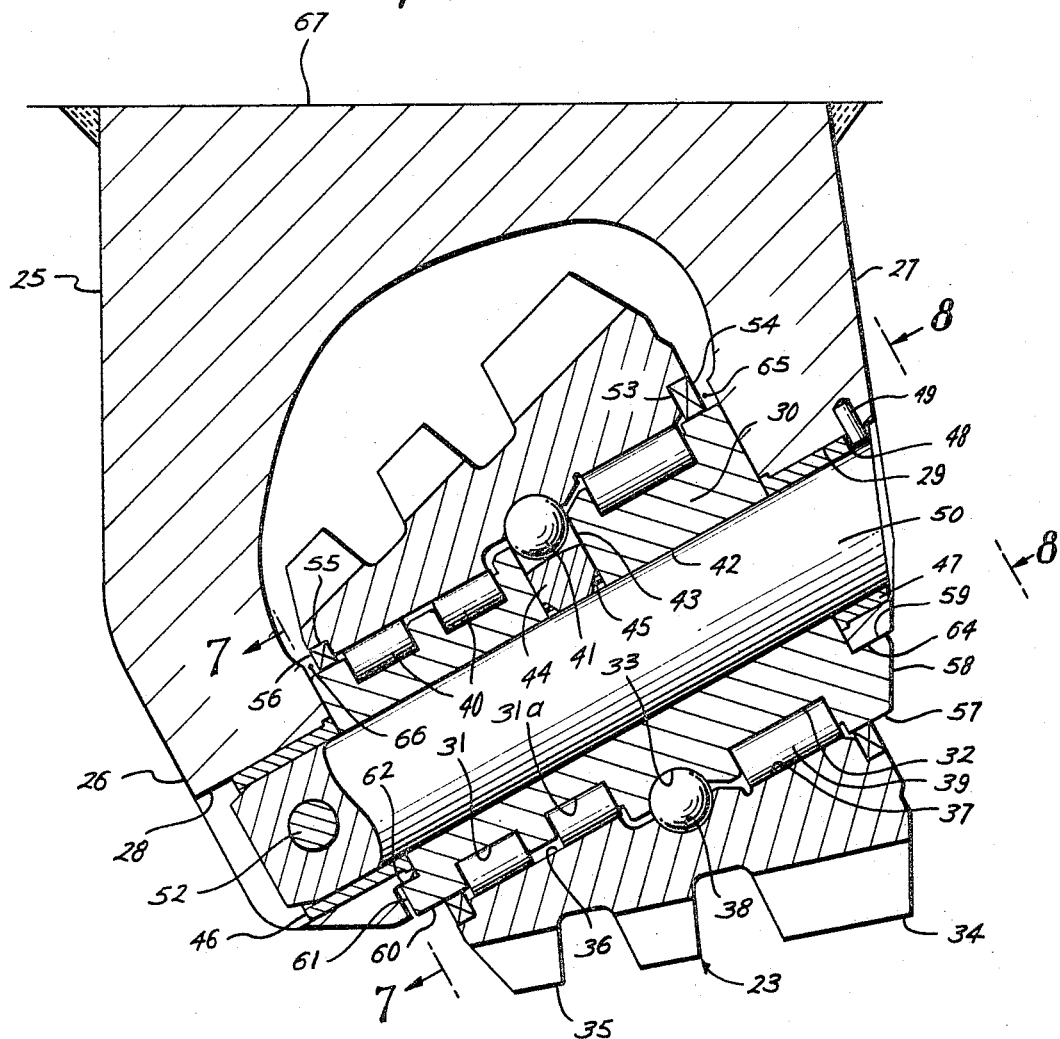

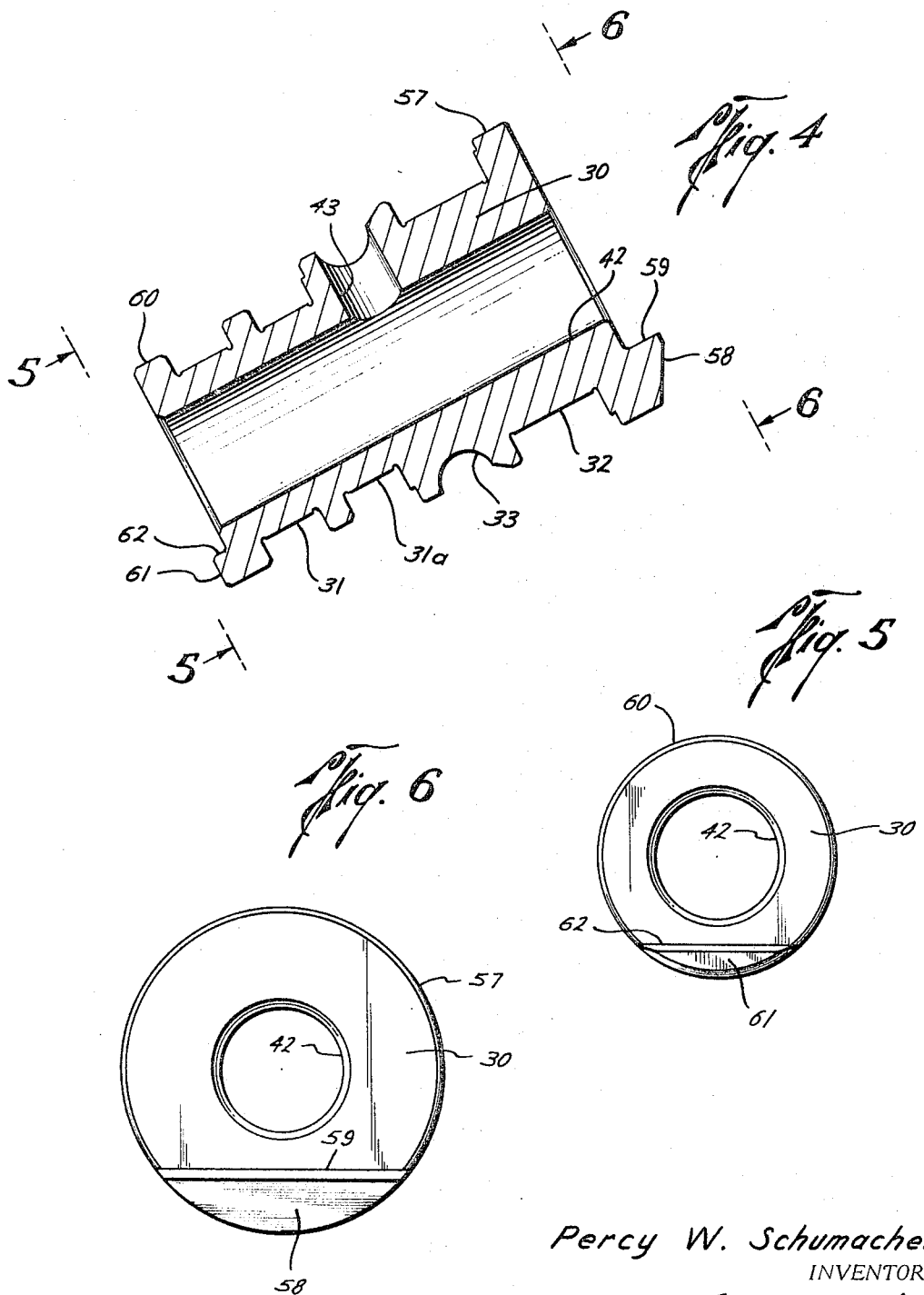

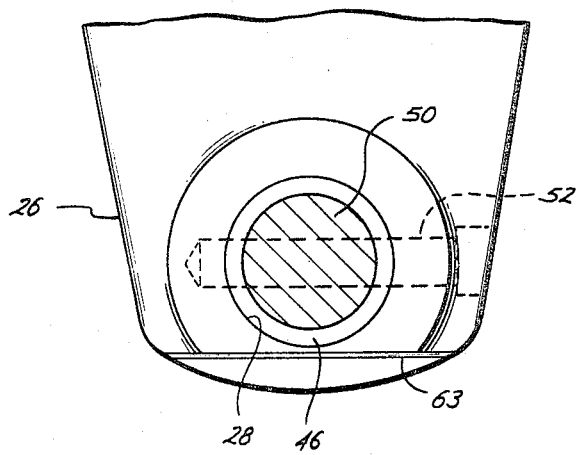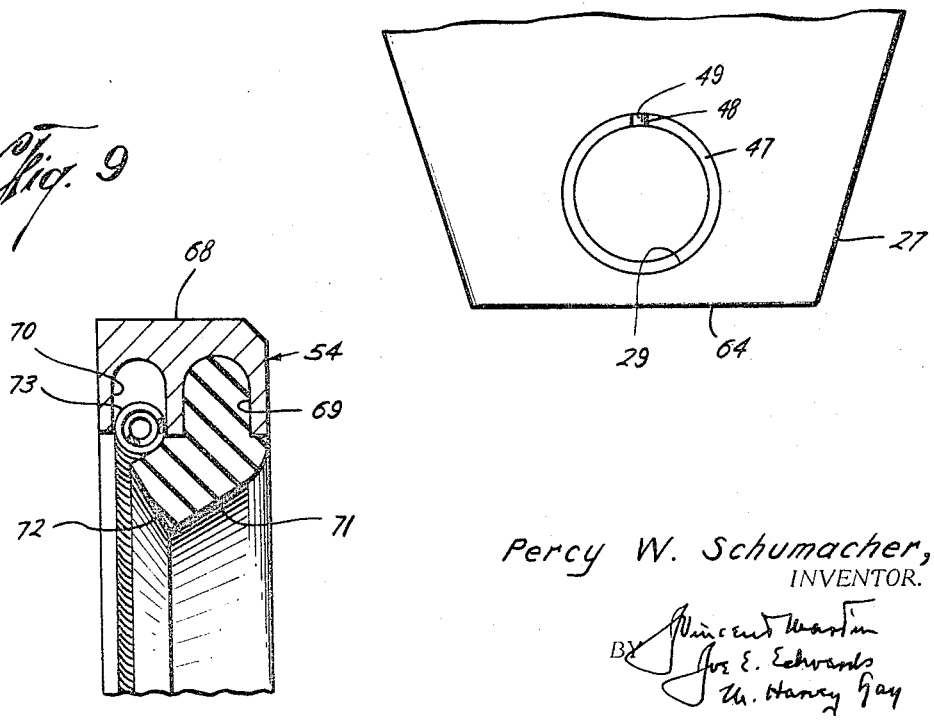

United States Patent Office 3,332,505
Patented July 25, 1967

3,332,505
DRILL BITS
Percy W. Schumacher, Jr., Houston, Tex., assignor to Reed Roller Bit Company, Houston, Tex., a corporation of Texas
Filed Dec. 31, 1964, Ser. No. 422,637
6 Claims. (Cl. 175—372)

This invention relates generally to an earth boring drill of the rotating cutter type and more particularly to a drill for drilling relatively large diameter bores.

The nature and substance of this invention has to do with cutter assemblies which are readily replaceable in the drill. A cutter support is welded or otherwise secured to a bit head and as such is more or less permanently attached thereto, there being a plurality of such cutter supports. The cutter assemblies may be replaced when the bearings or the teeth of the cutter are worn by simply removing a cap screw and a pin, whereupon the cutter and the bearings therein may be lifted out of the cutter support. This is a sub-assembly of parts. The feature shown herein is important because bits of the type described are usually twenty-four inches in diameter or greater and have made to cut diameters of six feet or more. Thus it will be appreciated that the entire drill bit assembly is extremely heavy and is not susceptible of conveniently being moved about. Since ordinarily the cutters and bearings and such associated parts are the parts that wear out, it will be apparent that it is much easier to bring a relatively light cutter sub-assembly to the bit than to remove the heavy bit from the drill stem and send it away from the drilling location in order for it to be repaired. Such cutter sub-assemblies may be kept in stock or may be supplied independently of the complete bit. All that is then required to provide new cutter-assemblies for the bit of the invention, is to install such cutter assembly in between the cutter supports, insert a pin and secure the pin to the support.

In the drilling of earth bores for wells, shafts, tunnels and the like, it is desirable to have a drill which is suitable for any of these purposes and which can readily be repaired without complete replacement of the entire drill. Further, it is desirable to have a drill bit which will operate with conventional types of circulation such as with air, water or mud in the drilling, for example, of wells and also one that is capable of certain drilling where no circulating medium is utilized such as in drilling of tunnels and in mining or the like.

It is an object of this invention to provide a drill capable of drilling large diameter bores such as in the drilling of wells and which also is suitable for mining or tunneling operations.

Another object is to provide a drill bit having replaceable cutter assemblies which are adapted to fit within cutter supports mounted on the nether side of a bit head.

Another object is to provide a new and improved drill bit having a cutter assembly which has improved sealing means therein in order to keep detritus out of the cutter bearing assembly.

Another object is to provide a new and improved bearing journal for a rock bit cutter assembly wherein the bearing journal is disposed between two cutter support legs and which bearing journal has locating flats thereon cooperating with corresponding flats on the cutter support legs to locate the bearing journal and position it in proper operating position and wherein the flats prevent the journal from turning about its own axis.

Another object is to provide a new and improved cutter assembly for a drill bit wherein the roller cutter and the bearings may be removed and replaced without removing the cutter support.

Another object is to provide a new and improved cutter sub-assembly for a drill bit wherein the cutter and the bearings may be put on a bearing journal and seals may be installed in the ends of the cutter before the cutter sub-assembly is installed in the cutter support on the bit head.

Another object is to provide a drill bit having substantially identical cutter assemblies thereon which may be readily replaced when worn.

Other objects will become apparent from the following description and the accompanying drawings, in which:

FIGURE 1 is a bottom plan view of the drill bit of the invention.

FIGURE 2 is a radial section through the drill with portions of the cutting structure and cutter traces moved into the plane of the paper to illustrate the manner of cutting the entire bottom of the hole being drilled.

FIGURE 3 is an enlarged detail view of the cutter assembly.

FIGURE 4 is an enlarged detail view of the bearing journal.

FIGURE 5 is a view taken along line 5—5 in FIGURE 4.

FIGURE 6 is a view taken along line 6—6 in FIGURE 4.

FIGURE 7 is a view taken along line 7—7 in FIGURE 3.

FIGURE 8 is a view taken along line 8—8 in FIGURE 3.

FIGURE 9 is an enlarged detail view, partly in section, showing a portion of the seal.

Referring to FIGURES 1 and 2, a bit 10 has a bit head 11, including a lower plate 12 and an upper plate 13. Extending between said plates are circular reinforcements 14 and 15 together with gussets 16 which are welded or otherwise secured to the plates 13 and 14. Bolted to the top of plate 13 is a flange 17 which is welded or otherwise secured to a tubular drill stem 18. The plate 13 has a hole 19 therethrough and the plate 12 has a hole 20 therethrough. The circular reinforcement 15 forms a passageway 21 which communicates with the holes 19 and 20 and with the interior of the drill stem 18. Welded or otherwise secured to the lower portion of the bit head 11 are cutter assemblies 22, 23 and 24. The cutter assembly 24 is the cutter assembly cutting closest to the rotating axis of the drill bit and it is here shown as being a cone-type cantilever cutter assembly. The cutter assemblies 22 and 23 are substantially identical except that the mounting angle of the cutter assembly 22 with respect to the bit head 11 is somewhat different from the cutter assembly 23 in that the cutter assemblies 22 are canted outboard so as to cut the gage of the hole being drilled. Other than the exception just noted, the assemblies 22 and 23 are identical so that a description of one will describe the other.

Referring to FIGURE 3, an enlarged view of the cutter assembly 23 is shown comprising a cutter support 25 having an inner support leg 26 and an outer support leg 27 spaced from said inner support leg. The inner support leg 26 has a hole 28 therethrough and the outer support leg 27 has a hole 29 therethrough. A bearing journal 30 extends between the support legs 26 and 27 and has a roller race 31 and a roller race 31a, an outer roller race 32 and a ball race 33. A cutter 34 having radially extending cutting elements 35 is provided with an inner roller race 36, an outer roller race 37 and a ball race 38. Roller bearings 39 are provided in the outer roller raceways, roller bearings 40 are provided in the inner roller raceways and ball bearings 41 are provided in the ball bearing raceways. The journal 30 has a bore 42 extending axially therethrough and a ball loading hole 43 extending from the bore 42 to the ball raceway 33 so that the balls 41 may be installed in the raceway. When a full complement of ball bearings 41 has been supplied to the raceway, a ball retaining plug 44 is inserted into the ball loading hole 43 and a snap ring 45 frictionally retains the ball retaining plug in place in the journal.

The hole 28 in the inner support leg 26 and the hole 29 in the outer support leg 27 are aligned and a bushing 46 is supplied within the hole 28 and a bushing 47 is supplied within the hole 29. The bushing 47 has a slot 48 and a roll pin 49 is provided within the slot 48 and in the support 27 to prevent the bushing 47 from turning about its axis. A bearing pin 50 extends through the bushings 47, 46 and the journal 30, and it is retained in place by means of a cap screw (not shown) which is inserted into the support 26 through the bushing 46 and pin 50 and is threaded into the hole 52.

The outer end of the cutter 34 has a counterbore 53 therein adjacent the roller race 37, and a seal 54 is pressed or otherwise secured within said counterbore. The other end of the cutter 34 has a counterbore 55 into which is pressed or otherwise secured a seal 56. The outer portion of the journal 30 has a cylindrical section with an axial projection or boss 58 extending therefrom. This axial projection has a radially inwardly facing flat surface 59. The journal 30 also has an inner cylindrical portion 60 which has an axial projection or boss 61 which projection has a radially inwardly facing flat surface 62. The lower portion of the inner support 26 has a flat 63 thereon.

The lower portion of the outer support 27 also has a flat 64 thereon. Thus when the journal 30 is installed between the supports 26 and 27, the flat surface 59 of the journal 30 is located by and registers with the flat surface 64 of the outer support 27 and the flat surface 62 of the journal 30 is located by and registers with flat 63 on the lower portion of support 26. In this manner the journal is accurately located and the flats just described prevent torque being applied to the pin 50 during the operation of the drill bit. This arrangement of the flats also prevents the journal 30 from turning about its own axis during the drilling operation.

As can be seen in FIGURE 3, the disposition of the cutter 34 on the journal 30 and the positioning of the journal 30 between the supports 26 and 27 provide a gap 65 between the outer face of the cutter 34 and the inner face of the outer support 27. This gap as shown is on the order of 3/16 of an inch and the surfaces of the cutter 34 and the support 27 define a substantially parallel gap. The arrangement of the gap so described tends to alleviate the accumulation of cuttings between the cutter and its associated supported in order to keep detritus from abrading away the outer seal 54. As will also be apparent, as the cutter rotates, the seal being pressed or tack welded into the cutter, also rotates and as a given portion of the seal 54 approaches the bottom of the bore hole being drilled, it leaves the cutter support 27 and is exposed to the exterior of the bit. With this arrangement the trapping of cuttings or detritus between the bit and its associated support is alleviated. A similar gap 66 is provided between the inner end of the cutter 34 and the inner cutter support 26 for the purpose just described.

The surface 67 of the cutter support 25, which may be made of a steel casting or the like, may be milled at various angles with respect to the rotating axis of the cutter so that it can be mounted on the bit head in accordance with the bottom hole configuration desired.

It will be apparent that the invention provides cutter assemblies which are readily replaceable in the drill. That is, the cutter support 25 ordinarily is welded or otherwise secured to the bit head 11 and as such is more or less permanently attached thereto. The cutter assemblies may be replaced when the bearings or the teeth of the cutter are worn by simply removing the cap screw 51 and removing the pin 50, whereupon the cutter and the journal 30 and the bearings therein may be lifted out of the cutter support 25. The bushings 46 and 47 then may be replaced if necessary and a new cutter sub-assembly comprising a journal 30, new bearings 39, 40 and 41 and a new cutter may be assembled together and new seals 54 and 56 may be pressed into the cutter to provide a cutter sub-assembly comprising the parts just described. The sub-assembly may then be placed into the cutter support 25 in bridging relation to the inner and outer support legs 26 and 27, and the cutter assembly will be located and positioned by the cooperating flat surfaces of the cutter supports and the bearing journal as just described, whereupon the pin 50 may be reinstalled therethrough and secured to the support by means of the cap screw 51. With this arrangement substantially all that is required to replace such cutter assembly is an internal wrench to remove the cap screw and a drift or punch to remove the pin 50. This feature is important because bits of the type described usually are 24″ in diameter or greater and have been made to cut diameters of 6′ or more. Thus it will be appreciated that the entire drill bit assembly is extremely heavy and is not susceptible of conveniently being moved about. Since ordinarily the cutters and bearings and such associated parts are the parts that wear out, it will be apparent that it is much easier to bring a relatively light cutter sub-assembly to the bit than to remove the heavy bit from the drill stem and send it away from the drilling location in order for it to be repaired.

Referring to FIGURE 9, a portion of the seal 54 is shown in enlarged detail partly in section. The seal 54 and the seal 56 are identical in construction except that they are of different sizes. The seal 54 comprises a relatively heavy metal ring 68 as opposed to the usual sheet metal type of ring used in seals. The ring 68 may be composed of steel and the inner periphery thereof has two annular grooves 69 and 70. An elastomeric member 71 composed of neoprene or other suitable oil-resistant material is vulcanized within the groove 69 and has a radially inwardly extending projection 72. A garter spring 73 is installed within the groove 70 and is adapted to urge said resilient projection 72 radially inwardly.

As previously stated, the seal 54 may be pressed into the counterbore of the cutter and if desired, the metal ring 68 of the seal 54 may be tack welded to the cutter 34 in order to insure that the seal remains in place in the cutter. As installed, the seal ring groove 69 faces inwardly of the cutter and it will be apparent that the seal projection 72 is so arranged that as it is installed into the cutter such projection 72 contacts the outer cylindrical portion 57 of the journal 30. Such arrangement is adapted to keep detritus or drilling fluids out of the cutter while it will permit lubricant or grease in the cutter to pass by the seal should the pressure in the cutter be greater than the ambient pressure exteriorly of the cutter.

To provide the cutter sub-assembly of the invention, the journal 30 may have heavy grease applied to the roller raceways 31, 31a and 32 and then have the roller bearings 40 and 39 disposed in said raceways, the grease being sufficiently heavy to retain the bearings in place while the cutter 34 is being assembled thereover. A full complement of balls 41 may then be installed through the hole 43 whereupon the ball retaining plug 44 may be installed in the hole 43 and the snap ring 45 installed in the same hole to frictionally engage the walls thereof and to retain the ball retaining plug 44 in place. The outer seal 54 is then pressed or otherwise secured into the outer counterbore 53 of the cutter 34, and the inner seal 56 is likewise pressed into the inner counterbore 55 of the cutter 34 or otherwise secured thereto. Such cutter sub-assebmlies may be kept in stock or may be supplied independently of the complete bit. All that is then required to provide new cutter-assemblies for the bit of the invention, is to install such cutter sub-assembly in between the cutter supports 27 and 26, insert the pin 50 therethrough and secure the pin to the support 26 by means of the cap screw 51 as previously described.

As previously mentioned, the drill bit of the invention may be used, particularly in mining or tunneling operations, without any circulating fluid; but if it is desired to use such bit in the drilling of a well or the like and use circulating fluid, then such fluid may be circulated downwardly through the hollow drill stem 18, through the holes 19 and 20 and passageway 21 to the area of the cutters whereupon the circuluating fluid carrying cuttings will be circulated upwardly between the bit and the wall of the bore hole being drilled. It is of course apparent that the circulation may be reversed to that just described in manners well known in the art.

The invention is not limited to the embodiment shown. Various changes within the scope of the following claims will become apparent to those skilled in the art.

I claim:

1. In an earth boring drill, a head having a substantially flat nether surface, means to rotate said head, cutter assemblies secured to said nether surface and extending downwardly therefrom and disposed radially thereon to cut annular paths on the bottom of the hole being drilled, each of said cutter assemblies comprising a support having spaced apart inner and outer support legs, a downwardly facing flat surface on each of said legs near the lower portion thereof, a bearing journal positioned and extending between said inner and outer legs, said journal having cylindrical ends and axially extending end projections thereon, each projection having a flat surface facing radially inwardly of said journal, said flats adapted to underlie and register with the flats on said legs, a roller cutter having radially extending cutting elements thereon, the said journal and cutter having complementary roller raceways and a ball raceway, roller and ball bearings and said raceways, the journal having an axial bore therethrough and a hole extending from said bore to said ball raceway, a ball retaining plug in said hole, a snap ring in said hole to retain said plug therein, the lower portion of each of said inner and outer legs having a hole therethrough adjacent the flat thereon, a pin extending through said holes in said legs and through said journal bore, means securing said pin to one of said legs to secure said pin axially and to prevent rotation of said pin on about its axis, the outboard end of said cutter having a counterbore adjacent its outboard roller race, and the inboard end of said cutter having a counterbore adjacent its inboard roller race, a seal pressed into each of said counterbores to rotate with the cutter, the seal comprising a heavy metal ring having two annular grooves in the surface of its inner periphery, an oil resistant elastomeric ring secured in the groove nearer the cutter bearings and extending radially inwardly to effect sealing engagement between said cutter and the cylindrical portion of the journal associated therewith, a garter spring in the other of said seal ring grooves adapted to urge said resilient ring radially inwardly, the cutter being arranged on said journal so that there is a parallel gap between each end of said cutter and its associated leg and whereby the lower portion of the seal in operation is exposed exteriorly so that detritus will not be trapped between the exterior of said seals and said legs.

2. In an earth boring drill, a head having a substantially flat nether surface, means to rotate said head, cutter assemblies secured to said nether surface and extending downwardly therefrom and disposed radially thereon to cut annular paths on the bottom of the hole being drilled, each of said cutter assemblies comprising a support having spaced apart inner and outer support legs, a flat surface on each of said legs near the lower portion thereof, a bearing journal positioned and extending between said inner and outer legs, said journal having cylindrical ends and axially extending end projections thereon, each projection having a flat surface facing radially inwardly of said journal, said flats adapted to underlie and register with the flats on said legs, a roller cutter having radially extending cutting elements thereon, the said journal and cutter having complementary roller raceways and a ball raceway, roller and ball bearings and said raceways, the journal having an axial bore therethrough and a hole extending from said bore to said ball raceway for the insertion of ball bearings therethrough into said ball raceway, a ball retaining plug in said hole, the lower portion of each of said inner and outer legs having a hole therethrough adjacent the flat thereon, a pin extending through said holes in said legs and through said journal bore, means securing said pin to one of said legs to secure said pin axially and to prevent rotation of said pin on about its axis, the outboard end of said cutter having a counterbore adjacent its outboard roller race, and the inboard end of said cutter having a counterbore adjacent its inboard roller race, a seal pressed into each of said counterbores to rotate with the cutter, the seal comprising a heavy metal ring having two annular grooves in the surface of its inner periphery, an oil resistant elastomeric ring secured in the groove near the cutter bearings and extending radially inwardly to effect sealing engagement between said cutter and the cylindrical portion of the journal associated therewith, a garter spring in the other of said seal ring grooves adapted to urge said resilient ring radially inwardly, the cutter being arranged on said journal so that there is a parallel gap between each end of said cutter and its associated leg and whereby the lower portion of the seal in operation is exposed exteriorly so that detritus will not be trapped between the exterior of said seals and said legs.

3. In an earth boring drill, a head having a substantially flat nether surface, means to rotate said head, a plurality of cutter assemblies mounted on said nether surface, each of said cutter assemblies comprising a support having spaced apart inner and outer support legs, a flat surface on each of said legs near the lower portion thereof, a bearing journal positioned and extending between said inner and outer legs, said journal having cylindrical ends and axially extending end bosses thereon, each boss having a flat surface facing radially inwardly of said journal, said flats adapted to underlie and register with the flats on said legs, a roller cutter adapted to be mounted on said journal, the said journal and cutter having complementary roller raceways and a ball raceway, roller and ball bearings and said raceways, the journal having an axial bore therethrough and a hole extending from said bore through said ball raceway for the insertion of ball bearings therethrough into said ball raceway, the lower portion of each of said inner and outer legs having a hole therethrough adjacent the flat thereon, a pin extending through said hole in said legs and through said journal bore, means securing said pin to one of said legs to secure said pin axially and to prevent rotation of said pin on about its axis, the outboard end of said cutter having a counterbore adjacent its outboard roller race, and the inboard end of said cutter having a counterbore adjacent its inboard roller race, a seal pressed into each of said counterbores to rotate with the cutter, the seal comprising a heavy metal ring having two annular grooves in the surface of its inner periphery, an oil resistant elastomeric ring secured in the groove nearer the cutter bearings and extending radially inwardly to effect sealing engagement between said cutter and the cylindrical portion of the journal associated therewith, a garter spring in the other of said seal ring grooves adapted to urge said resilient ring radially inwardly, the cutter being arranged on said journal so that there is a parallel gap between each end of said cutter and its associated leg and whereby the lower portion of the seal in operation is exposed exteriorly so that detritus will not be trapped between the exterior of said seals and said legs.

4. In an earth boring drill, a head having a mounting surface, means to rotate said head, cutter assemblies secured to said surface, each of said cutter assemblies comprising a support having spaced apart inner and outer support legs, a flat surface on each of said legs near the lower portion thereof, a bearing journal positioned and extending between said inner and outer legs, said journal having cylindrical ends and axially extending projections thereon, each projection having a flat surface facing radially inwardly of said journal, said flats adapted to underlie and register with the flats on said legs, a roller cutter adapted to be mounted on said journal, the journal having an axial bore therethrough, the lower portion of each of said inner and outer legs having a hole therethrough adjacent the flat thereon, a pin extending through said hole in said legs and through said journal bore, means securing said pin to one of said legs to secure said pin axially and to prevent rotation of said pin on about its axis, the outboard end of said cutter having a counterbore, and the inboard end of said cutter having a counterbore, a seal pressed into each of said counterbores to rotate with the cutter, the seal comprising a heavy metal ring having two annular grooves in the surface of its inner periphery, an oil resistant resilient ring secured in the groove nearer the cutter interior and extending radially inwardly to effect sealing engagement between said cutter and the cylindrical portion of the journal associated therewith, a garter spring in the other of said seal ring grooves adapted to urge said resilient ring radially inwardly, the cutter being arranged on said journal so that there is a parallel gap between each end of said cutter and its associated leg and whereby the lower portion of the seal in operation is exposed exteriorally so that detritus will not be trapped between the exterior of said seals and said legs.

5. In an earth boring drill, a head having a mounting surface, means to rotate said head, cutter assemblies secured to said surface and extending therefrom and disposed radially thereon to cut annular paths on the bottom of the hole being drilled, each of said cutter assemblies comprising a support having spaced apart inner and outer support legs, a flat surface on at least one of said legs near the lower portion thereof, a bearing journal positioned and extending between said inner and outer legs, said journal having cylindrical ends and axially extending projections thereon, at least one of said projections having a flat surface facing radially inwardly of said journal, said flat adapted to underlie and register with the flat surface on one of said legs, a roller cutter adapted to be mounted on said journal, the journal having an axial bore therethrough, the lower portion of at least one of said inner and outer legs having a hole therethrough adjacent the flat thereon, a pin extending through said hole in said legs and through said journal bore, means securing said pin to one of said legs to secure said pin axially and to prevent rotation of said pin on about its axis, the outboard end of said cutter having a counterbore, and the inboard end of said cutter having a counterbore, a seal pressed into each of said counterbores to rotate with the cutter, to effect sealing engagement between said cuter and he cylindrical portion of the journal associated therewith, the cutter being arranged on said journal so that there is a parallel gap between each end of said cutter and its associated leg and whereby the lower portion of the seal in operation is exposed exteriorally so that detritus will not be trapped between the exterior of said seals and said legs.

6. In an earth boring drill, a head having a mounting surface, means to rotate said head, a cutter assembly secured to said surface, said cutter assembly comprising a support, a cutter and a journal, the said journal and cutter having complementary roller raceways and a ball raceway, roller and ball bearing and said raceways, the end of said cutter having a counterbore adjacent the roller race, a seal secured in said counterbore to rotate with the cutter, a seal comprising a heavy metal ring having two annular grooves in the surface of its inner periphery, an oil-resistant elastomeric ring secured in the groove nearer the cutter bearings and extending radially inwardly to effect sealing engagement between said cutter and the journal, a garter spring in the other of said seal ring grooves adapted to urge said resilient ring radially inwardly, the cutter being arranged on said journal so that there is a parallel gap between the end of said cutter and the support and whereby the lower portion of the seal in operation is exposed exteriorly so that detritus will not be trapped between the exterior of said seal and the support.

References Cited

UNITED STATES PATENTS

| | | | |
|---|---|---|---|
| 2,103,583 | 12/1937 | Howard | 175—372 X |
| 2,177,867 | 10/1939 | Catland | 175—372 X |
| 2,272,405 | 2/1942 | Grant | 175—362 X |
| 3,203,492 | 8/1965 | Lichte | 175—372 X |
| 3,216,513 | 12/1965 | Robbins | 175—372 X |

CHARLES E. O'CONNELL, *Primary Examiner.*

N. C. BYERS, *Assistant Examiner.*